Aug. 12, 1941.   H. F. FLOWERS   2,251,993
DUMP VEHICLE
Original Filed July 21, 1937   3 Sheets-Sheet 1

Inventor
Henry Fort Flowers
By Mason & Porter
Attorneys

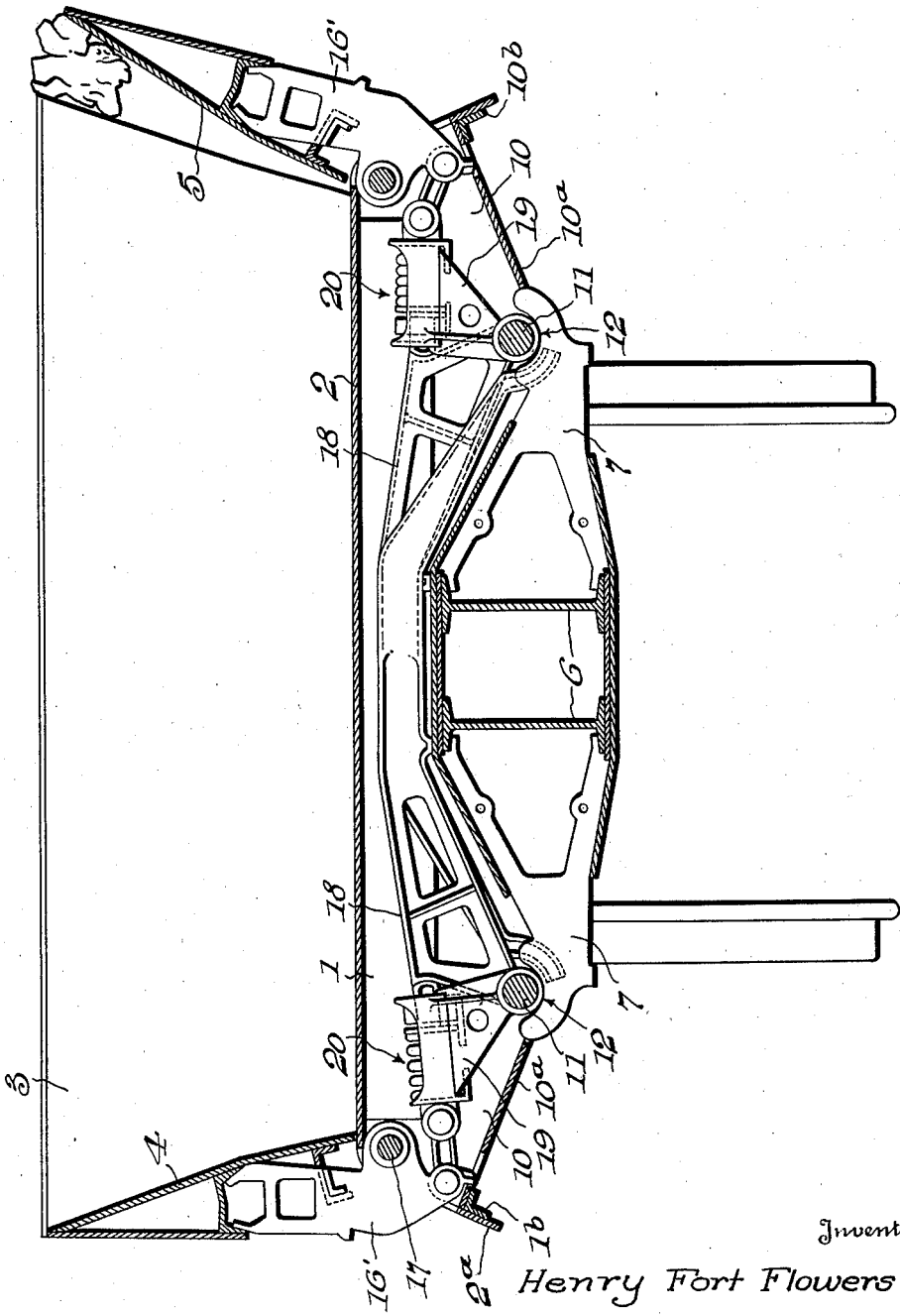

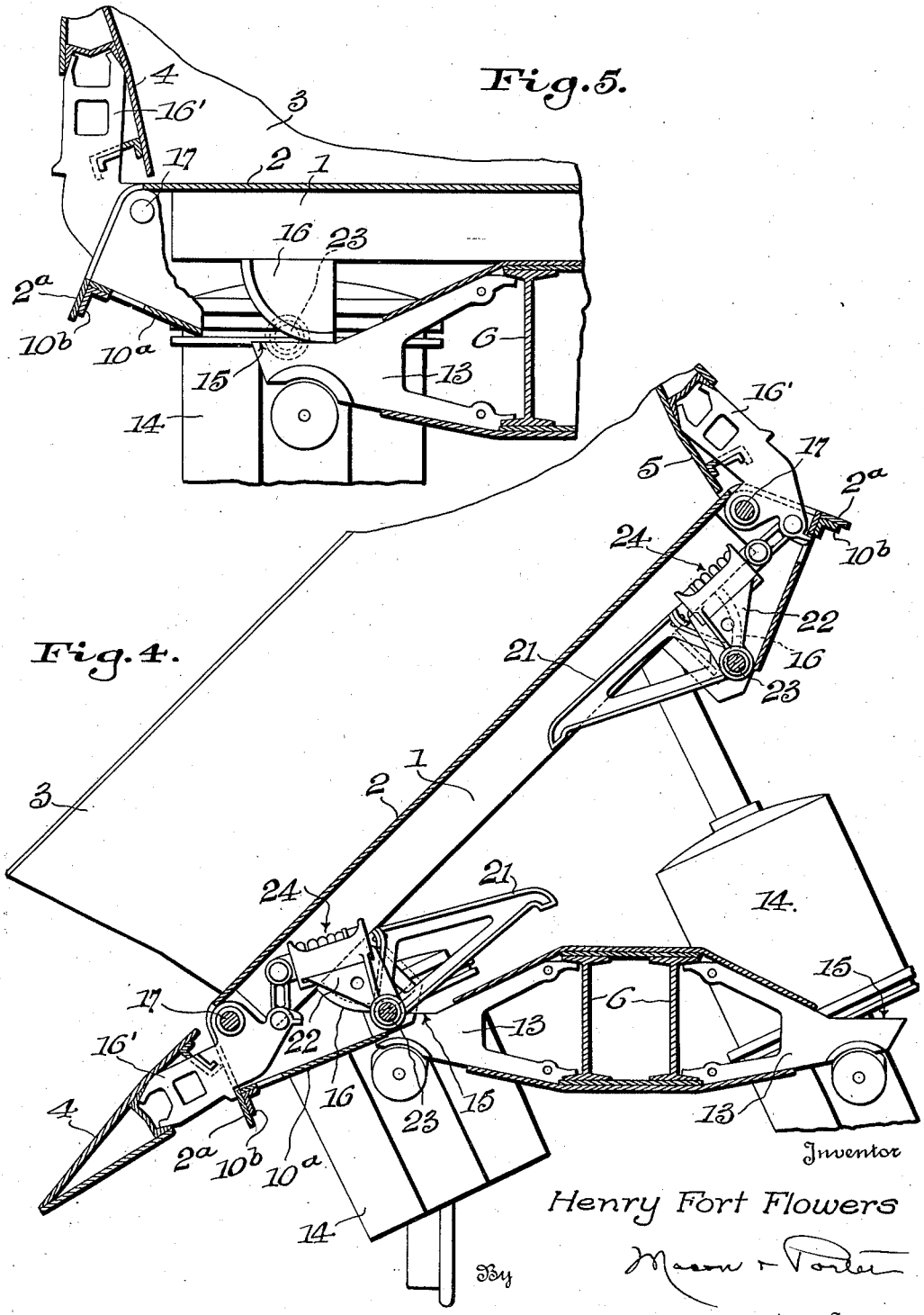

Patented Aug. 12, 1941

2,251,993

UNITED STATES PATENT OFFICE 2,251,993

DUMP VEHICLE

Henry Fort Flowers, Findlay, Ohio

Original application July 21, 1937, Serial No. 154,891, now Patent No. 2,200,271, dated May 14, 1940. Divided and this application April 13, 1940, Serial No. 329,558

8 Claims. (Cl. 105—272)

The invention relates to new and useful improvements in a dump vehicle, that is, a vehicle wherein the body is mounted on the underframe so that it may be selectively tilted to either side for dumping the contents thereof.

An object of the invention is to provide a support for the body which is strong and durable, on which the body may be tilted to dumping position, and wherein the load during transport and during tilting, is advantageously distributed on the underframe.

An object of the invention is to provide a dump vehicle of the character stated in which the dump body is fulcrumed at each side of the frame so that it can be dumped toward either side, and in which novel means is provided for supporting the body in rolling contact in combination with the pivotal mounting.

Another object of the invention is to provide a dump vehicle of the character stated including door position controlling elements pivotally mounted, means for supporting the dump body in rolling contact during dumping, and means forming fulcrum seats for the pivotal mountings of said elements to form pivotal mounting for the dump body in combination with said rolling contact support.

Another object of the invention is to provide a dump vehicle of the character stated in which the dumping of the body is effected by fluid pressure means including cylinder and piston means, in which the rolling contact supporting means includes rockers depending from the body and engaging brackets having horizontal surfaces extending laterally of the center of the body, said brackets including trunnion mountings for said cylinders disposed beneath said horizontal surfaces.

This application constitutes a division of my original application for U. S. Letters Patent entitled Dump vehicle and filed July 21, 1937, Serial No. 154,891 and which eventuated into Patent 2,200,271 on May 14, 1940.

With the above and other objects in view which will more fully appear, the nature of the invention will be more clearly understood by following the description, the appended claims, and the several views illustrated in the accompanying drawings.

In the drawings:

Figure 3 is a transverse sectional view through the body and underframe, said section being taken at one side of the bolster and the main door controlling mechanism, and showing at the right, an obstruction preventing the closing of the door.

Figure 4 is a transverse sectional view through the underframe and the body taken on a line at one side of the auxiliary door controlling mechanism, the body being illustrated as tilted.

Figure 5 is a transverse sectional view at one side of the power lifting devices and showing the shifting fulcrum support for the body.

The invention is directed to a dump vehicle wherein the body is supported on an underframe so that it may be selectively tilted to either side for dumping. The underframe includes a center beam mounted on trucks, both of which are of the usual construction. Adjacent the ends of the center beam are transversely extending bolsters. The body is supported so as to tilt about fulcrums on the bolsters. Intermediate the bolsters are transversely extending supporting brackets for the power cylinders. These brackets also serve as a body support, said body having rockers which engage plates on the supports for the power cylinders. These fulcrum supports combine with the rockers to provide a combined pivotal and rolling contact support for the body. The body is provided with down-folding doors and suitable controlling mechanisms cooperating therewith and which are disclosed in detail in my original application for U. S. Letters Patent hereinbefore referred to.

It is believed the invention will be better understood by a detail description of the illustrated embodiment thereof. The body consists of cross beams 1 on which is mounted a floor plate 2. At the ends of the body are end members 3 which may be mounted in any suitable way. Mounted at each side of the body is a down-folding door, which doors are indicated at 4 and 5, respectively.

Figure 1:
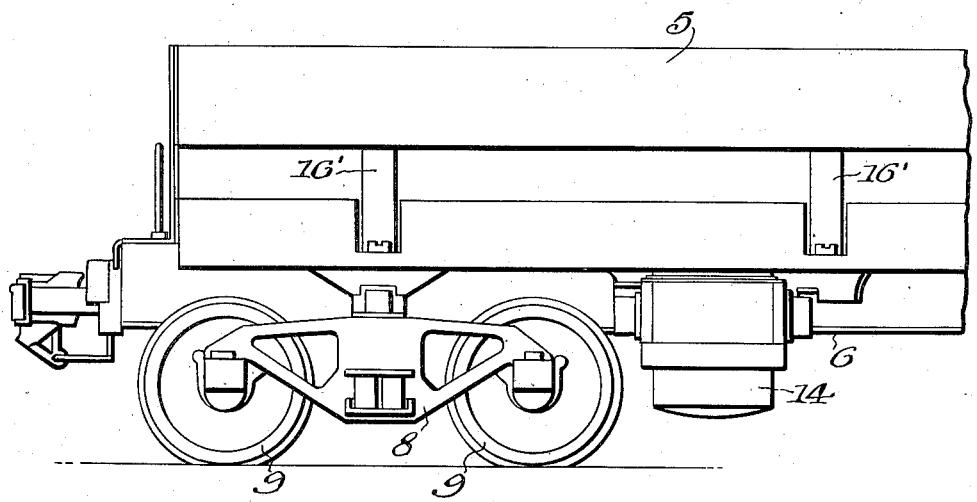
Figure 1 is a side view of a portion of the vehicle embodying the improvements.
Figure 2:
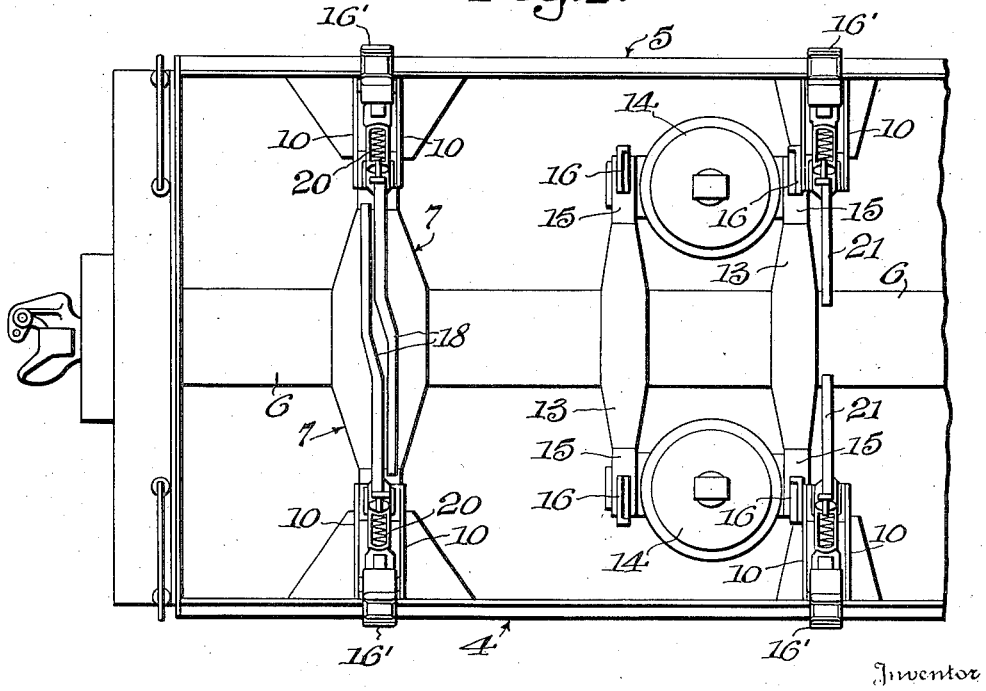
Figure 2 is a view in plan showing more or less diagrammatically the tilting body frame with the door plate, floor plate, and floor panels removed.

The underframe on which the body is mounted consists of a center beam 6 which is of the usual construction. Said center beam 6 is provided with laterally projecting members 7, 7 which may be formed of steel plates, stamped members or in any suitable way. These members 7, 7 constitute the bolster on which the body is mounted, so that it can be tilted selectively about fulcrums at opposite sides of the underframe. The underframe is in turn supported on a truck bolster carrying truck frames, one of which is indicated at 8 in Figure 1. The truck frame is mounted on wheels 9, 9 which, as indicated, are intended to travel on rails, but it is understood that the wheels and underframe support carried thereby may be of any desired construction.

Depending from the floor beams at each side of the body are body supporting plates 10 which are connected by a pin 11. These pins 11 serve as the fulcrum pins on which the body tilts during dumping. The members 7 forming the bolster are provided with U-shaped recesses 12 which serve as fulcrum supports for the body when the body is tilted, and also which serve as supports for the body during loading and transport.

Projecting laterally from the center beam 6 are power cylinder supporting members 13, 13. These members may be constructed in any suitable way and carry trunnion supports for the power cylinders 14, 14. There are power cylinders at each side of the underframe, and these power cylinders are provided with the usual lifting pistons which are in turn connected to the body so that the body may be raised selectively at one side or the other for positioning the body so as to dump the contents thereof. The power cylinders per se and the specific manner of operating the same form no part of the present invention.

The supporting members 13 for the power cylinders also serve as body supports. The upper face 15 of the supporting member 13 is substantially horizontal. There is a horizontal supporting surface 15 at each side of the underframe and the body is provided with rockers 16 which cooperate, respectively, with these horizontal surfaces 15 on the support for the power cylinders. The horizontal surface 15 as shown at the left in Figure 4, is disposed so that it lies in a plane containing the center line of the fulcrum pins. In Figure 5 of the drawings, the body is shown in righted position, and the rocker bears on the surface 15 at a point well inside of the line containing the center of the fulcrum pins. When the body is moved to tilted position, then the rocker rests on the horizontal surface 15 at a point outside of the line containing the center of the fulcrum pins. See Figure 4. There are a number of advantages obtained by the use of these rockers in combination with the fulcrum pins. There is sufficient deflection in the parts to permit the rockers to move with pure rolling motion from the normal position for loading to dumping position. There are rockers at each side of the cylinder and the cylinder trunnions are suspended from the brackets, the tops of which serve as supports for the rockers. When air is admitted to the cylinder to lift the body on one side, the torsional deflection of the underframe and the deflection of the body transfers the weight from the bolster pivot trunnions to the rocker trunnions during the first part of the tilting movement, so that there is a pure rolling motion carrying the major part of the load until the body approaches tilted position, at which point the air pressure is reduced. The result is that during the latter part of the stroke, the body bears at the bolster pivot points as well as on the rockers in proportion to the weight of the body over the respective fulcrum points. Furthermore, during the first part of the stroke, less air pressure is required to lift the body than it would if the fulcrum supports adjacent the cylinders were on the same center line as at the bolsters. As the body approaches tilted position, the weight of the load, to a certain extent, is transferred to the door, and therefore, less air is required to tilt the body. The movement of the point of contact of the rocker with the supporting surface therefor has moved out away from the center of the vehicle and tends to retard the dumping movement at the end of the stroke and thus assists the cylinders in cushioning the tilting movement so as to further reduce the shock at the end of the stroke.

The floor 2 of the body is provided with a depending skirt 2a which is secured to the depending plates 10. There is a cross plate 10a connecting said plates 10, 10, and an angle bar 10b connecting the skirt and the cross plate 10a. The door is provided with a series of hinge brackets 16', and these hinge brackets are mounted on pivot pins 17 carried by the floor beams. The skirt 2a is slotted to permit the hinge brackets to extend beneath the floor 2. At the bolsters there are independent door controlling devices for each door.

The door controlling devices include main and auxiliary control means and have been disclosed in detail in the parent application for U. S. Letters Patent hereinbefore referred to. These specific controlling devices form no part of the invention herein claimed and only general reference will be made thereto.

The main controlling devices, disposed at the positions of the bolsters include main and auxiliary arms 18 and 19 both having sleeves embracing the respective fulcrum pin 11 and these sleeves are dimensioned so as to fit in the seats 12 in the fulcrum members 7 and constitute the fulcrum trunnions for the body. These arms interengage and are link connected with the respective doors through yieldable spring equipments generally designated 20 and which cooperate with the arms in positively controlling the opening and closing of the doors and yet provide for necessary yielding of parts to prevent breakage should the doors engage obstructions while opening or closing.

The auxiliary control means which cooperate with the main control means briefly described above are generally similar in construction and function and include main and auxiliary arms 21 and 22 fulcrumed at 23 in plates depending from the body. These arms also interengage and are link connected with the respective doors through yieldable spring equipments generally designated 24.

These main and auxiliary door controlling mechanisms operate to hold the doors closed during loading and during transport. The door controlling mechanism also holds the door closed at the elevated side and controls the opening and closing of the door at the dumping side. This control mechanism is so constructed that if the door strikes an obstruction during opening, it can move toward closed position while the body continues to tilt. Furthermore, the controlling mechanism for the doors includes compression springs which operate to hold the doors tightly closed, and which can yield to prevent the breaking of parts in case the door strikes an obstruction to prevent its movement to full closed position. As previously stated, however, these specific control equipments are covered in the parent case hereinbefore referred to and form no part of the invention claimed herein except insofar as they are included in the means which pivotally supports the body for dumping purposes. The present invention resides in the provision of the novel means herein described in detail for providing combined pivotal and rolling contact support for the dump body.

It is of course to be understood that the details of structure and arrangement of parts may be variously changed and modified without departing from the spirit and scope of my invention.

I claim:

1. In a dump vehicle, an underframe, a dump body, means for pivotally supporting the body to permit dumping, and interengaging rocker and bracket means carried respectively by the body and the underframe for supporting the body in rolling contact during dumping in conjunction with said pivotal support, the engaging faces of said rocker and bracket being so shaped and cooperatively disposed that they contact inwardly of the pivotal center of dumping during the first portion of dumping and outwardly of said center of dumping during the last part of the dumping.

2. In a dump vehicle, an underframe, a dump body, means at each side of the center of the body for pivotally supporting the body to permit dumping toward either side, and interengaging rocker and bracket means carried respectively by the body and the underframe for supporting the body in rolling contact during dumping in conjunction with said pivotal support, the engaging faces of said rocker and bracket being so shaped and cooperatively disposed that they contact inwardly of the pivotal center of dumping during the first portion of dumping and outwardly of said center of dumping during the last part of the dumping.

3. In a dump vehicle, an underframe including a center beam, bolster means projecting laterally from the center beam and having fulcrum seats at their outer ends, a dump body, fulcrum means carried by said body and engageable in said seats for providing a fulcrum mounting tiltably mounting said body for selective dumping at either side, bracket members projecting laterally from said center beam and having upwardly presented body supporting surfaces, and means depending from the body for engaging said supporting surfaces in rolling contact for supporting said body while it is tilting about the fulcrum mounting.

4. In a dump vehicle, an underframe including a center beam, bolster means projecting laterally from the center beam and having fulcrum seats at their outer ends, a dump body, fulcrum means carried by said body and engageable in said seats for providing a fulcrum mounting tiltably mounting said body for selective dumping at either side, bracket members projecting laterally from said center beam and having upwardly presented body supporting surfaces, and means depending from the body for engaging said supporting surfaces in rolling contact for supporting said body while it is tilting about the fulcrum mounting, said supporting surfaces being flat and disposed in a horizontal plane including the fulcrum mounting centers, and said rolling contact means being centered relative to said mounting centers whereby said rolling contact means engages the flat surfaces inwardly of the tilting center at the start of dumping and outwardly of the tilting center at the end of dumping.

5. In a dump vehicle, an underframe including a center beam, bolster means projecting laterally from the center beam and having fulcrum seats at their outer ends, a dump body, fulcrum means carried by said body and engageable in said seats for providing a fulcrum mounting tiltably mounting said body for selective dumping at either side, bracket members projecting laterally from said center beam and having upwardly presented body supporting surfaces, and means depending from the body for engaging said supporting surfaces in rolling contact for supporting said body while it is tilting about the fulcrum mounting, power cylinders disposed at opposite sides of the center beam, trunnions carried by the bracket members on which said cylinders are mounted, each power cylinder having a piston connected to the body for selectively tilting said body to one side or the other for dumping.

6. In a dump vehicle, an underframe including a center beam, bolster means projecting laterally from the center beam and having fulcrum seats at their outer ends, a dump body, fulcrum means carried by said body and engageable in said seats for providing a fulcrum mounting tiltably mounting said body for selective dumping at either side, bracket members projecting laterally from said center beam and having upwardly presented body supporting surfaces, and means depending from the body for engaging said supporting surfaces in rolling contact for supporting said body while it is tilting about the fulcrum mounting, said supporting surfaces being flat and disposed in a horizontal plane including the fulcrum mounting centers, and said rolling contact means being centered relative to said mounting centers whereby said rolling contact means engages the flat surfaces inwardly of the tilting center at the start of dumping and outwardly of the tilting center at the end of dumping, power cylinders disposed at opposite sides of the center beam, trunnions carried by the bracket members directly beneath the flat supporting surfaces and on which said cylinders are mounted, each power cylinder having a piston connected to the body for selectively tilting said body to one side or the other for dumping.

7. In a dump vehicle, an underframe including a center beam, bolster members projecting laterally from the center beam and having the outer ends thereof shaped so as to provide recesses serving as fulcrum supports for the body, a dump body, depending plates carried thereby, fulcrum trunnions supported by said plates adapted to engage the fulcrum supports on the underframe whereby said body may be selectively tilted for dumping at either side thereof, bracket members projecting laterally from said center beam, each bracket member having a flat supporting surface for the body, rockers carried by said body having curved faces adapted to contact with said supporting faces on the bracket members, said rockers being disposed so as to contact with the flat surfaces of said bracket members at points nearer the center of the underframe than the center line of the trunnion when the body is in normal position for loading and for transport, and said rockers contacting with said supporting surfaces at points outside of the center line of the trunnion when the body approaches full tilted position for dumping.

8. In a dump vehicle, an underframe including a center beam, bolster members projecting laterally from the center beam and having the outer ends thereof shaped so as to provide recesses serving as fulcrum supports for the body, a dump body, depending plates carried thereby, fulcrum trunnions supported by said plates adapted to engage the fulcrum supports on the underframe whereby said body may be selectively tilted for dumping at either side thereof, bracket members projecting laterally from said center beam, each bracket member having a flat supporting surface for the body, rockers carried by said body having curved faces adapted to contact with said supporting faces on the bracket members, said rockers being disposed so as to contact with the flat surfaces of said bracket members at points nearer the center of the underframe than the center line of the trunnion when the body is in normal position for loading and for transport, and said rockers contacting with said supporting surfaces at points outside of the center line of the trunnion when the body approaches full tilted position for dumping, power cylinders disposed at opposite sides of the center beam, trunnions carried by said bracket members on which said power cylinders are mounted, each power cylinder having a piston connected to the body for selectively tilting said body to one side or the other for dumping.

HENRY FORT FLOWERS.